United States Patent
Bae et al.

(10) Patent No.: US 10,713,775 B2
(45) Date of Patent: Jul. 14, 2020

(54) ITEM INSPECTING DEVICE

(71) Applicant: KOH YOUNG TECHNOLOGY INC., Seoul (KR)

(72) Inventors: Young Heon Bae, Seoul (KR); Seung Jun Lee, Seongnam-si (KR); Jeong Yeob Kim, Icheon-si (KR); Deok Hwa Hong, Gwangmyeong-si (KR); Moon Young Jeon, Seongnam-si (KR); Joon Koo Kang, Bucheon-si (KR); Joongki Jeong, Gwangmyeong-si (KR); Jae Yoon Jung, Seoul (KR); Jong Hui Lee, Seoul (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 117 days.

(21) Appl. No.: 15/741,027

(22) PCT Filed: Jun. 30, 2016

(86) PCT No.: PCT/KR2016/007081
§ 371 (c)(1),
(2) Date: Apr. 17, 2018

(87) PCT Pub. No.: WO2017/003241
PCT Pub. Date: Jan. 5, 2017

(65) Prior Publication Data
US 2019/0035066 A1    Jan. 31, 2019

(30) Foreign Application Priority Data

Jun. 30, 2015 (KR) .................. 10-2015-0093731
Jun. 30, 2015 (KR) .................. 10-2015-0093769

(51) Int. Cl.
*G06K 9/00*     (2006.01)
*G06T 7/00*     (2017.01)
(Continued)

(52) U.S. Cl.
CPC .............. *G06T 7/001* (2013.01); *G01B 11/24* (2013.01); *G01B 11/25* (2013.01);
(Continued)

(58) Field of Classification Search
CPC ................... G06T 7/001; G06T 7/0004; G06T 2207/30148; H01L 2224/96; G01N 21/8851
(Continued)

(56) References Cited

U.S. PATENT DOCUMENTS 7,342,655 B2 *   3/2008   Yagita ................ G01N 21/9027
                                                       250/223 B
8,225,939 B2 *   7/2012   Nelson .................... B07C 5/342
                                                       209/315
(Continued)

FOREIGN PATENT DOCUMENTS

JP    2005-227201     8/2005
JP    2006-317266     11/2006
(Continued)

OTHER PUBLICATIONS

International Search Report for International Application No. PCT/KR2016/007081, dated Nov. 2, 2016.

*Primary Examiner* — Charlotte M Baker
(74) *Attorney, Agent, or Firm* — Kile Park Reed & Houtteman PLLC (57) ABSTRACT

An item inspection apparatus includes an image obtaining section and a control section. The image obtaining section obtains a captured image of at least a part of an item. The control section determines whether the item is defective by using the captured image of the item. The control section performs a first inspection for at least one of position, shape and size with respect to at least one of a first element and a second element. The first element has a predetermined shape
(Continued)

and is formed on the item and the second element includes at least one of an opening, a depression and a through-hole formed in the item. The control section performs a second inspection for at least one of foreign substance adhesion, scratch and surface stain on the item. Thus, the defect inspection may be performed more precisely and effectively.

8 Claims, 5 Drawing Sheets

(51) Int. Cl.
*G01B 11/24* (2006.01)
*G01B 11/25* (2006.01)
*G01N 21/95* (2006.01)
*G01N 21/88* (2006.01)

(52) U.S. Cl.
CPC ..... *G01N 21/8851* (2013.01); *G01N 21/9515* (2013.01); *G06T 7/0006* (2013.01); *G01N 2021/8874* (2013.01); *G01N 2021/8887* (2013.01); *G06T 2207/10024* (2013.01)

(58) Field of Classification Search
USPC ....... 382/141, 100, 128, 148, 151, 254, 260, 382/263, 287, 294, 173; 356/239.5; 250/223 B; 209/538, 315, 552, 577, 938; 348/88
See application file for complete search history.

(56) References Cited

U.S. PATENT DOCUMENTS

| | | | |
|---|---|---|---|
| 8,289,386 B2* | 10/2012 | Kagawa | G01N 21/8983 348/88 |
| 8,934,704 B2* | 1/2015 | Hirano | G06T 7/0004 382/100 |
| 9,117,137 B2* | 8/2015 | Uchiyama | G06K 9/46 |
| 2015/0043820 A1* | 2/2015 | Minato | G06T 11/60 382/173 |

FOREIGN PATENT DOCUMENTS

| | | |
|---|---|---|
| JP | 2008-32525 | 2/2008 |
| KR | 10-2011-0078228 | 7/2011 |
| KR | 10-2012-0090926 | 8/2012 |
| KR | 10-2013-0035826 | 4/2013 |
| KR | 10-1457040 | 10/2014 |
| KR | 10-1483956 | 1/2015 |

* cited by examiner

ITEM INSPECTING DEVICE

TECHNICAL FIELD

The present invention relates to an item inspection apparatus. More particularly, the present invention relates to an item inspection apparatus inspecting whether an item is defective.

BACKGROUND ART

With the development of technology, it has become possible to produce various types of items in various ways. For example, in the past, cutting or grinding could produce an item having a desired shape. Alternatively, a so-called plastic injection method in which a liquid material such as a liquid plastic is injected into a metal mold consisting of various materials, and then cooled and injected to form a part is also utilized. In particular, recently, a so-called computerized numerical control (CNC) method of producing an item using a numerical control machine equipped with a microprocessor has been introduced to mass-produce various items.

Meanwhile, to cope with population growth and market growth, manufacturers who manufacture items have faced the challenge of producing a variety of items at low cost. In particular, as the use period of various products becomes shorter, the time required to equip the mass production facility of the item becomes shorter. Herein, another challenge for manufacturers with rapid mass production is to maintain the yield of the produced items. In the period when the product was produced by the handicrafts, the workers performed and controlled all the production work directly. Thus, despite the design of the same item, it was impossible to maintain the quality of the item to be consistent due to various environmental factors such as the worker's skill level and fatigue. Meanwhile, since the era of large-scale automatic production by machines has been achieved, uniformity in manufacturing has been able to be gained to a great extent. However, inspection of various mechanical errors and item failures occurring in the production and assembly process of each item are not only costly because the methods used by the workers are still done by the naked eye, but also still have a problem that the consistent standard of judging the quality of products may not be applied due to the skill or fatigue of individual workers or the difference of individual standards as with the problems in the age of production of handicraft products.

In addition, consumers' standards for quality are increasing day by day. Thus, in producing items, manufacturers are also devoting efforts to eliminate defective items in the production and assembly process of the item, intermediate process and final assembly completion process. As part of this effort, in the assembly process, it is one technical challenge to determine whether the item meets the reference quality by using various inspection equipment, and pre-remove intermediate assemblies deemed to be of poor quality, so that high and uniform quality for the finished product is maintained and a high yield is obtained.

DISCLOSURE

Technical Problem

Examining in detail the method of inspecting an intermediate product or a finished product occurring in the manufacturing process of an item as described above, a method currently used in an industrial field is to capture an image of an item to be inspected using a capturing device, and manually check the captured images by workers performing the inspection one by one.

However, as noted above, this method not only incurs excessive costs for inspection, but also affects quality by various external factors such as skill level, fatigue and labor environment of individual workers as in the production process of conventional products. In addition, the inspection speed is not sufficient and is likely to affect the productivity of the item.

Therefore, in order to solve such a problem, it is required to introduce an inspection apparatus and method capable of performing automatic inspection of items by the same standard, and an inspection apparatus and method capable of performing inspection of items more precisely and effectively.

Technical Solution

According to an exemplary embodiment of the present invention, an item inspection apparatus includes an image obtaining section and a control section. The image obtaining section obtains a captured image of at least a part of an item. The control section determines whether the item is defective by using the captured image of the item. The control section performs a first inspection for at least one of position, shape and size with respect to at least one of a first element and a second element. The first element has a predetermined shape and is formed on the item and the second element includes at least one of an opening, a depression and a through-hole formed in the item. The control section performs a second inspection for at least one of foreign substance adhesion, scratch and surface stain of the item.

In an exemplary embodiment, the control section may perform the first inspection by comparing the captured image with reference data of the item corresponding to the captured image, based on a feature defined by a shape-based characteristic of at least one of the first element and the second element externally input or automatically extracted.

In an exemplary embodiment, the feature may include at least one of information on a feature object corresponding to at least one of the first element and the second element and relationship information between a plurality of feature objects.

In an exemplary embodiment, the information on the feature object may include at least one of dimension information of the feature object, position information of the feature object, and geometric shape information of the feature object. The relationship information between the plurality of feature objects may include at least one of relative distance information between the feature objects, offset information between the feature objects, and geometric shape information between the feature objects.

In an exemplary embodiment, the control section may establish an inspection area for the feature object, and establishes a good product standard for the feature object.

In an exemplary embodiment, the control section may establish a correlation between the feature objects and establishes a good product standard for the correlation.

In an exemplary embodiment, the control section may perform the second inspection by comparing the captured image with reference data of the item corresponding to the captured image based on at least one of height, brightness, and color obtained from the captured image of the item.

In an exemplary embodiment, the control section may establish an area corresponding to at least one of an opening, a depression and a through-hole formed in the item as a masking area and performs only the first inspection of the first inspection and the second inspection for the masking area.

In an exemplary embodiment, the item may correspond to a component of a final finished product, and the control section may exclude from the second inspection where the item is shielded from external exposure by assembly with other components.

According to another exemplary embodiment of the present invention, an item inspection apparatus includes an image obtaining section and a control section. The image obtaining section obtains a captured image of at least a part of an item. The control section determines whether the item is defective by using the captured image of the item. The image obtaining section captures a good item corresponding to the item to obtain a good item captured image. The control section generates reference data by using the good item captured image and inspects the item by comparing the reference data with the captured image obtained from the item.

In an exemplary embodiment, the control section may perform an inspection for at least one of position, shape and size with respect to at least one of a first element and a second element. The first element has a predetermined shape and is formed on the item and the second element includes at least one of an opening, a depression and a through-hole formed in the item. The control section may perform the inspection by comparing the captured image with reference data of the item corresponding to the captured image, based on a feature defined by a shape-based characteristic of at least one of the first element and the second element externally input or automatically extracted.

In an exemplary embodiment, the item inspection apparatus may further include an input section receiving modification information that is input for modifying the feature. For example, the modification information may be generated based on statistical processing results on inspection results obtained by inspection of the item.

In an exemplary embodiment, the reference data may be generated by using a statistical method based on a plurality of good item captured images obtained from a plurality of good items. For example, the reference data may be generated by averaging the good item captured images.

In an exemplary embodiment, the control section may establish defect information including a defect type for inspecting the item and tolerances for each defect type automatically or via input. For example, the defect type may include at least one of overcut, undercut, scratch, color, scrape, overhang and flatness.

Advantageous Effects

With the item inspection apparatus according to the present invention, the manufacturer may automatically and efficiently perform the inspection of the item to be inspected. In addition, the inspection criteria of the item to be inspected may be changed according to the condition of the item. In addition, even though there is no given information such as a design drawing for the item to be inspected in advance, the information about the reference data, defects, etc. for the inspection may be generated by itself, so that the inspection may be proceeded.

In addition, according to the present invention, it is judged whether or not the item is defective by using the captured image of the item, and herein a forming defect inspection due to a forming error in the manufacturing process of the item and an appearance defect inspection due to a fault in the appearance of the item are performed in duality, so that the defect inspection may be performed more precisely and effectively.

In addition, the forming defect inspection may be performed on a first element and a second element of the item, and performed based on a feature defined by a shape-based characteristic, so that the defect inspection may be performed more precisely and effectively.

In addition, the appearance defect inspection may be performed on foreign substance adhesion, scratch and surface stain on the item, and performed based on scratch, surface smear, etc., and performing inspection based on height, brightness, color, etc. obtained from the captured image of the item, so that the defect inspection may be performed more precisely and effectively.

In addition, by establishing a masking area in at least a portion of the second elements, only the forming defect inspection among the forming defect inspection and the appearance defect inspection may be performed for the masking area, so that an unnecessary operation load may be reduced and an inspection speed may be improved.

With the item inspection apparatus according to the present invention, the manufacturer may automatically and efficiently perform the inspection of the inspection target item. In addition, the inspection standard of the inspection target item may be changed according to the condition of the item.

In addition, it is may be determined whether the item is defective by using the captured image of the item. Herein, the reference data is generated using the good item captured image obtained by image-capturing a good item corresponding to the item, and the reference data and the captured image of the inspection target item are compared to inspect the item. Thus, it may be possible to generate information on the reference data and defects for the inspection itself and to carry out the inspection even though there is no given information such as a design drawing for the inspection target item in advance.

In addition, when a plurality of good item captured images are used, the reference data may be generated from the plurality of good item captured images utilizing a statistical method such as averaging, etc., so that the defect inspection may be performed more precisely and effectively.

In addition, modification information necessary for modifying feature information, which is the basis of the comparison, may be input in inspection, and modification information may be generated based on statistical processing results of inspection results, so that the defect inspection may be performed more precisely and effectively.

In addition, defect information including a defect type for inspecting the item and a tolerance for each defect type may be established, so that the defect inspection may be performed more precisely and effectively.

MODE FOR INVENTION

The present invention is described more fully hereinafter with reference to the accompanying drawings, in which example embodiments of the present invention are shown. In the following description, however, well-known functions or constructions will not be described in detail in case of obscuring the subject matter of the present invention.

In this specification, various terms are used to define the invention, but the concept of the invention should not be limited to the terms used in this specification.

The present invention is susceptible of various modifications and various forms, specific embodiments are illustrated in the drawings and described in detail in the text. It is to be understood, however, that the intention is not to limit the invention to the particular forms disclosed, but to include all modifications, equivalents, and alternatives falling within the spirit and scope of the invention.

Although the terms first, second, etc. may be used herein to describe various elements, these elements should not be limited by these terms. These terms are only used to distinguish one element from another element. For example, without departing from the scope of the present invention, a first element could be termed a second element, and similarly, a second element could be termed a first element.

The terminology used herein is for the purpose of describing particular example embodiments only and is not intended to be limiting of the present invention. As used herein, the singular forms are intended to include the plural forms as well, unless the context clearly indicates otherwise. It will be further understood that the terms "comprise", "have", etc. when used in this specification, specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which this invention belongs.

It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an example of an item to be inspected for describing an operation of an item inspection apparatus according to the present invention may be considered as a part such as a rear case for a mobile phone. A rear case for a mobile phone is a rectangular box-shaped hollow part, may be formed of metal, plastic, glass or the like, and includes large and small openings arranged for various purposes such as a switch, a camera and a sound output of a speaker, etc. In addition, the rear case also contains an internal structure for storing various components such as a battery, and circuit boards for communication and control, etc.

Hereinafter, for convenience of explanation, an embodiment of the item inspection apparatus according to the present invention is described in consideration of a situation in which an inspection of a rear case part for a mobile phone is performed. However, those skilled in the art will appreciate that, it will be possible to implement the present invention by recognizing that it may also be used for all parts having a three-dimensional structure in addition to the rear case part.

Figure 1:
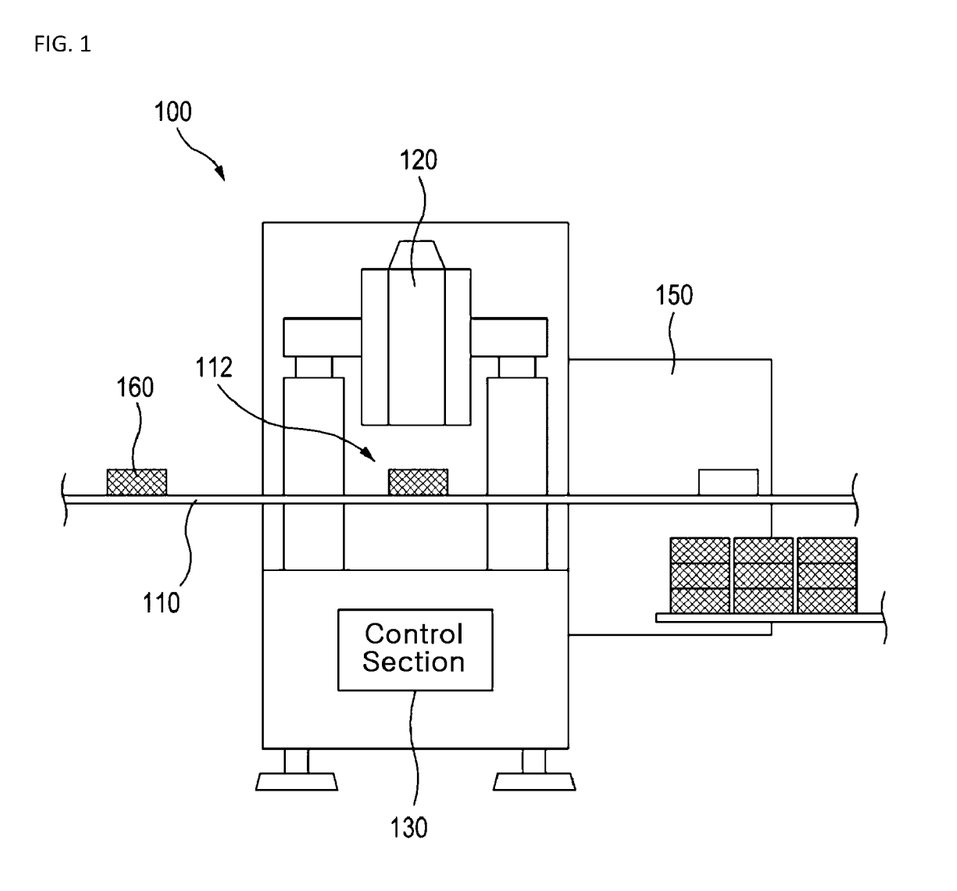
FIG. 1 is a front view showing an item inspection apparatus according to an embodiment of the present invention.

FIG. 1 is a front view showing an item inspection apparatus according to an embodiment of the present invention.

An item inspection apparatus 100 according to an embodiment of the present invention includes a transfer section 110 and a measuring section 120 and a control section 130. In addition, a component such as an item providing section (not shown) or a buffer 150 may be added for driving the item inspection apparatus 100.

The transfer section 110 may transfer an inspection target item so that the measuring section 120 may measure the target item to obtain a captured image and the control section 130 may use the captured image to determine whether the target item is defective.

The transfer unit 110 has a configuration for transferring an item. As described above, the item inspection apparatus 100 according to an embodiment of the present invention assumes a rear case for a mobile phone as the inspection target part. Thus, an example of the operation of the transfer section 110 will be described with reference to a method of transferring a rear case for a mobile phone in connection with the present embodiment.

For example, when an item is delivered to the transfer section 110 from the item providing section storing an inspection target item 160, the transfer section 110 transfers the item to a predetermined position 112. The predetermined position may be a position where the item is stopped by the need for assembly or the like, and in the present invention, the predetermined position 112 may be such a position that the measuring section 120 may measure the captured image of the inspection target item 160.

After the measuring section 120 measures and acquires the captured image of the inspection target item 160, the transfer section 110 continues to transfer the inspection target item 160. As will be described in more detail in the following embodiment, the transfer section 110 may include an additional component such as a flip device section for flipping the inspection target item 160 to support imaging measurements in various aspects of the inspection target item 160.

For example, assuming that the measuring section is located at the upper portion of the inspection apparatus, as shown in FIG. 1, the measuring section basically measures the upper surface of the inspection target item. By using the element such as the flip device section, in addition to the upper surface of the inspection target item, it is possible to measure the lower surface of the inspection target item, and 90° or 270° rotated surface, and it is possible to obtain information on various sides of the inspection target item through the captured images thus measured.

When it is determined as an inspection result that the inspection target item 160 is not defective and that the quality of the inspection target item 160 is satisfactory, the transfer section 110 may transfer the inspection target item that has been inspected to an apparatus for carrying out the next process for producing the item such as assembly after the inspection, etc. or to an intermediate buffer 150. Alternatively, the transfer section 110 may temporarily suspend the transport of the inspection target item 160 based on the inspection result performed in the control section 130, and automatically or manually wait until the inspection result is determined or an instruction for disposal of the inspection target item 160 is issued. Alternatively, when the control section 130 determines that the inspection target item 160 is defective, the transfer section 110 may transfer the inspection target item 160 in a different path from the products determined to be good in order to discard the inspection target item 160.

The measuring section 120 includes a configuration for acquiring the captured image for the inspection target item 160.

In the case of a rear case part for a mobile phone, which is an inspection target item for the purpose of explanation of the present invention, on the basis of a box shape that is hollow and open on the top as described above, the four walls on the top, bottom, left and right sides may have an input switch for power button, volume control, etc. or an opening for speaker, microphone, etc., the rear surface of the rear case part may have an opening for projecting a camera lens depending on the design of the mobile phone, and the rear case part may further include a step-like structure therein for assembling various components such as a battery or a circuit board. In addition, it may be necessary to inspect not only the rear case part for the mobile phone itself but also whether it is good or not such an assembly state that the various components such as the various buttons and internal components as described above are assembled with the rear case part.

The captured image may include a two-dimensional plane image or a pattern image of the inspection target item, depending on the illumination source.

For example, a two-dimensional plane image may be obtained by irradiating non-patterned light such as monochromatic light, and a pattern image may be obtained by irradiating pattern light. The pattern image thus obtained may generate a three-dimensional image by the control section 130.

Particularly, in order to acquire a three-dimensional image, various conventional methods may be utilized. In an embodiment of the present invention, a method of calculating a height of each point in an image from a pattern change caused by a step on the surface of the target by irradiating the target with predetermined pattern light while changing the pattern light as necessary may be used to obtain a three-dimensional image. For example, a bucket algorithm may be utilized.

To this end, the measuring section 120 may include an irradiating section for irradiating a target with non-patterned light or pattern light, and a capturing section for capturing an image of the target item.

Alternatively, the item inspection apparatus 100 may be provided with a captured image provided from an external device, instead of acquiring a captured image directly by capturing in the measuring section 120. That is, the item inspection apparatus 100 may include an image obtaining section, and the image obtaining section may directly measure an image of the inspection target item 160 such as the measuring section 120, or receive the captured image from an external device.

The control section 130 uses the captured image of the item to determine whether the item is defective. Specifically, the control section 130 performs a forming defect inspection due to a forming error in the manufacturing process of the item and an appearance defect inspection due to a fault in the appearance of the item.

The captured image of the item may include a two-dimensional plane image of at least a portion of the item, a pattern image for at least a portion of the item, etc., and include an image including information about a two-dimensional shape or a three-dimensional shape and information about various attributes such as color, brightness, saturation, etc.

In one embodiment, the forming defect inspection may include inspection for at least one of position, shape and size with respect to at least one of a first element of the item and a second element of the item. Herein, the first element means an element having a predetermined shape and formed on the item. For example, the first element may include at least a portion of a circuit pattern formed on the item, a protrusion protruding from the body of the item, a component attached to the item, etc. The second element means an element whose shape is defined by partially removing a body of the item or the first element, or an element whose shape is defined relatively by a surrounding shape thereof or the first element. For example, the second element may include an opening, a depression, a through-hole, etc. formed in the item.

In one embodiment, the control section 130 may inspect a forming defect of the item by comparing the captured image with reference data of the item corresponding to the captured image, based on a feature defined by a shape-based characteristic of at least one of the first element and the second element externally input or automatically extracted.

In one embodiment, the feature may include at least one of information on a feature object corresponding to at least one of the first element and the second element and relationship information between a plurality of feature objects.

In one embodiment, the information on the feature object may include at least one of dimension information of the feature object, position information of the feature object, and geometric shape information of the feature object.

For example, the feature may include information on the protrusion 420 (see FIG. 4) corresponding to the first element, that is, at least one of dimension information (width, length, and protrusion height information) of the protrusion 420, position information of the protrusion 420 and geometric shape information (fillet, tilt, etc.) of the protrusion 420. Also, the feature may include dimension information (radius, major radius, minor radius, etc.) of the opening 410 (see FIG. 4) corresponding to the second element, position information of the opening 410 and geometric shape information (curvature, eccentricity, etc.) of the opening 410.

In addition, the relationship information between the plurality of feature objects may include at least one of relative distance information between the feature objects, offset information between the feature objects, and geometric shape information between the feature objects.

For example, the feature may include at least one of relative distance information, offset information, and geometric shape information, with respect to between the protrusions 420, between the openings 410, or between the protrusion 420 and the opening 410.

In one embodiment, the control section 130 may establish an inspection area for the feature object and establish a good product standard for the feature object. Specifically, the control section 130 may establish an inspection area for the first element or the second element, and establish a good product standard for the first element or the second element. For example, the control section 130 may establish an inspection area for the protrusion 420 or the opening 410, and establish a good product standard based on the dimension information, the position information, the geometry information, and the like of the protrusion 420 or the opening 410, and perform a forming defect inspection according to the good product standard.

In addition, the control section 130 may establish a correlation between the feature objects and establish a good product standard for the correlation. Specifically, the control section 130 may establish a correlation between the first elements, between the second elements, or between the first element and the second element, and establish a good product standard for the correlation. For example, the control section 130 may establish a correlation between the protrusions 420, between the openings 410, and between the protrusion 420 and the opening 410, and establish a good product standard based on relative distance information, offset information, and geometric shape information, with respect to between the protrusions 420, between the openings 410, or between the protrusion 420 and the opening 410, and perform a forming defect inspection according to the good product standard.

In one embodiment, the appearance defect inspection may include inspection of at least one of foreign substance adhesion, scratch and surface stain on the item.

Specifically, during the manufacturing process, the item may be adhered with sticking foreign substance, scratch may occur, and a stain may be formed during an anodizing process, so that the appearance defect such as the above may occur.

In order to judge the appearance defect such as the above, it may be checked whether or not an area having a different brightness distribution and/or height distribution from the surroundings exists in the inspection area.

In one embodiment, the control section 130 compares the captured image with reference data of the item corresponding to the captured image based on at least one of the height, brightness, and color obtained from the captured image of the item.

Meanwhile, as described above, the image obtaining section may include the measuring section 120 directly measuring an image of the inspection target item 160 to obtain a captured image, and the measuring section 120 may image-capture a good item corresponding to the item and directly acquire the good item captured image.

As will be described in more detail below, the control section 130 may generate reference data using the good item captured image, and compare the reference data with the captured image obtained from the item to inspect the item. Herein, the reference data may be generated using statistical methods based on a plurality of good item captured images obtained from a plurality of good items.

Generally, when producing an item, the item is produced based on a design drawing prepared by CAD software or the like. Thus, when inspecting an item, it is possible to carry out an inspection based on a design drawing thereof or an ideal form of the item obtained from such a design drawing. However, depending on a mode of production, for example, for a manufacturer preparing for an item supply contract, a requester making manufacturing request requires a high level of security for the manufacturer, so that the design drawing is not directly disclosed, and so on.

For this case, reference data that is a basis of the comparison directly from the sample item may be generated. Using the method of directly generating the reference data not only has a merit that the manufacturer may proceed with the inspection of the item for the above situation but also has a merit that the various types of items may be inspected even though a form and a standard are not determined beforehand.

Through the item inspection apparatus according to an embodiment of the present invention, a user obtains a captured image of a sample item, and then prepares reference data from the captured image, so that it may be possible to generate the reference data from the sample item itself without any predefined external criteria such as a design drawing, etc. and to create a new inspection standard by comparing the reference data with the actual sample item or by reviewing the reference data itself, thereby referring to the new inspection standard in the production of the item and making it possible to determine a defect directly or automatically.

Returning to the description, the control section 130 basically may establish an inspection condition based on the reference data when there is reference data that is available from external input such as a design drawing, CAD, and perform an inspection by comparing the established inspection condition with a three-dimensional image and/or a three-dimensional image. However, when there is no reference data that is available from external input in advance as described above, according to another embodiment of the present invention, a method of directly generating such reference data from a sample inspection target may be utilized.

The control section 130 may display the inspection result on the display unit (not shown) of the inspection apparatus after the inspection target item 160 is inspected according to the above description. The inspection result may include a two-dimensional image and/or a three-dimensional image of the inspection target, a position and a shape of a defect of the target identified in the inspection process, and numerical data related thereto.

Meanwhile, when the inspection target item 160 is judged to be an item having a good quality without defects, the control section 130 may control that the transfer section 110 transfers the inspection target item 160 to the buffer 150 or the next stage of the item inspection apparatus 100 in the production facility. On the other hand, when the inspection target item 160 is judged to be an item having a defect, the control section 130 may control the transfer section 110 to stop the transport, and the user's judgment is waited for.

Meanwhile, it is not preferable in terms of time and resources to perform the inspection of the item on the whole area, so that it is possible to selectively perform inspection on a specific area of the item.

Figure 2:
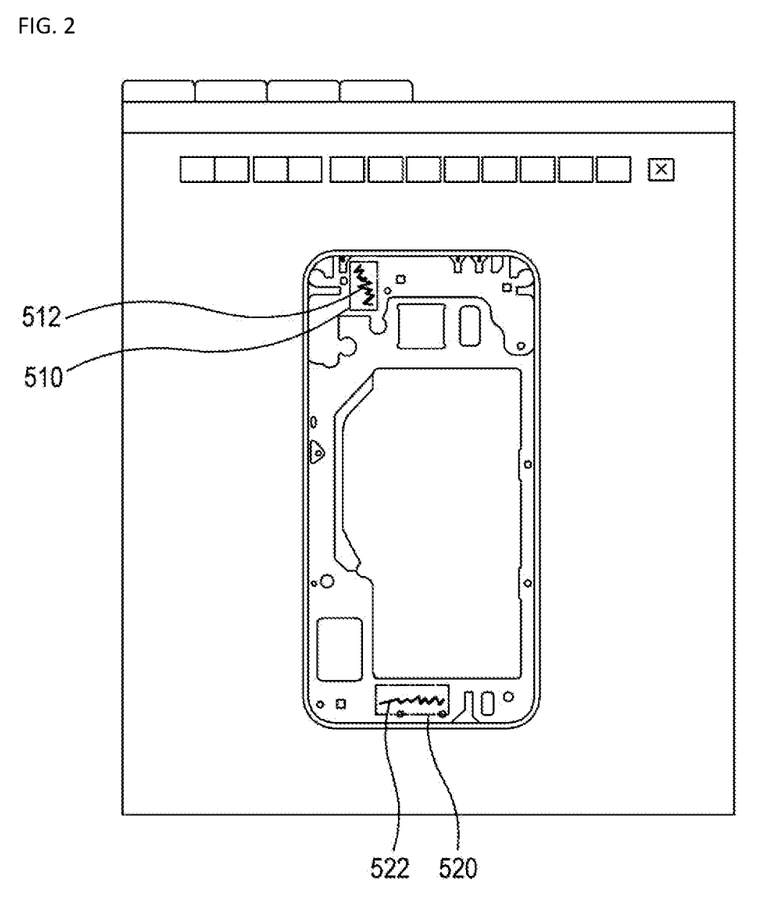
FIG. 2 is a plan view for explaining an area excluded from an appearance defect inspection for an item of the item inspection apparatus in FIG. 1.

FIG. 2 is a plan view for explaining an area excluded from an appearance defect inspection for an item of the item inspection apparatus in FIG. 1.

Referring to FIG. 2, in the case of a specific area, it may be excluded from the appearance defect inspection for the item of the item inspection apparatus.

Specifically, the inspection target item may correspond to a part such as a rear case employed in the final finished mobile phone. Herein, the control section 130 (see FIG. 1) may exclude from the appearance defect inspection where the item is shielded from external exposure by assembly with other components.

For example, as shown in FIG. 2, an appearance defect, such as a scratch 512 in a first area 510 of the item surface, may significantly reduce the value of the item, whereas a scratch 522 in a second area 520 is masked from external exposure by subsequent assembly processes and does not affect the value of the final item. In this case, it may be possible to quickly perform the appearance defect inspection by establishing a comparison area so that the reference data and the associated area of the two-dimensional image and/or the three-dimensional image of the measured item are compared only with respect to the first area 510.

Figure 3:
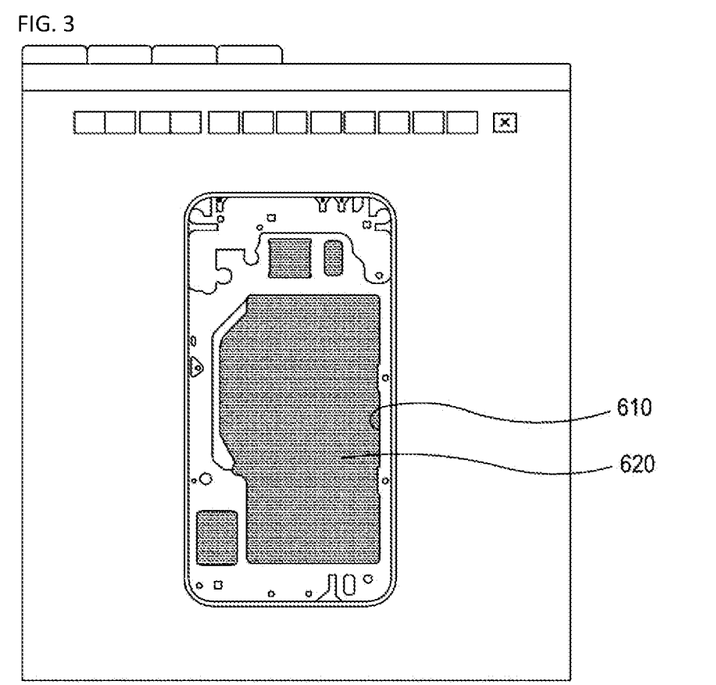
FIG. 3 is a plan view for explaining designation of a masking area for performing only a forming defect inspection for an item of the item inspection apparatus in FIG. 1.

FIG. 3 is a plan view for explaining designation of a masking area for performing only a forming defect inspection for an item of the item inspection apparatus in FIG. 1.

Referring to FIG. 3, a masking area may be established for item inspection at a specific part of the item. When a captured image is acquired for an item, it may not be necessary to conduct the inspection for a specific area such as an area where an opening is formed. In this case, the area may be masked to exclude the area from the comparison target.

In one embodiment, the control section 130 (see FIG. 1) may establish an area corresponding to at least one of an opening, a depression, and a through hole formed in the item as a masking area, and only the forming defect inspection among the forming defect inspection and the appearance defect inspection may be performed for the masking area.

Specifically, the opening, the depression, the through hole, and the like formed in the item correspond to the second element, which means an element whose shape is defined by partially removing a body of the item or the first element, or an element whose shape is defined relatively by a surrounding shape thereof or the first element, and does not have an actual shape. Thus, by establishing a masking area in at least a portion of the second elements, an unnecessary operation load may be reduced and an inspection speed may be improved.

For example, in the case of a rear case for a mobile phone, an opening 610 where the battery is mounted occupies a large portion of the inspection target item, but masking (620) the opening 610 may greatly reduce the operation load, and greatly improve the inspection speed.

Meanwhile, only the forming defect inspection among the forming defect inspection and the appearance defect inspection may be performed for the masking area. That is, even in case of a portion corresponding to the second element such as the opening 610, the forming defect inspection among the forming defect inspection and the appearance defect inspection may be performed.

For example, the opening 610 may appear different in dimension, position, geometric shape, and the like from the reference data due to a forming defect, and the relationship information between the opening 610 and another feature object, i.e., relative distance information, offset information, geometric shape information, and the like may appear different from the reference data. Thus, the appearance defect inspection related to the opening 610 may be omitted, and the forming defect inspection related to the opening 610 may be performed.

Figure 4:
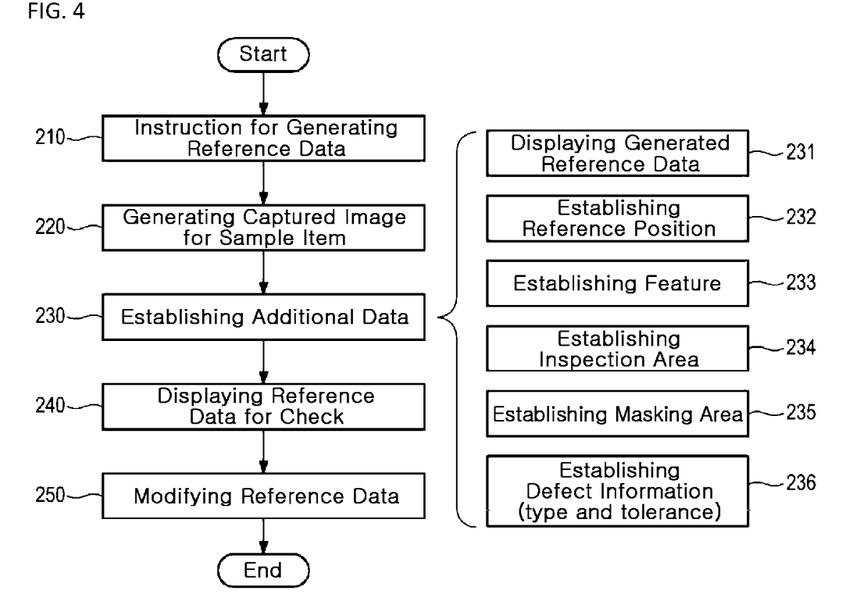
FIG. 4 is a flowchart showing how to generate reference data by the item inspection apparatus in FIG. 1.

FIG. 4 is a flowchart showing how to generate reference data by the item inspection apparatus in FIG. 1.

As described above, depending on the manufacturing environment, there may not be previously provided data to be used as a basis for inspecting the inspection target item. In this case, a user directly measures the sample item and adds contents to be a basis for inspection, thereby making it possible to generate reference data directly.

The reference data may include image data of an ideal item that is the basis of the comparison and may include additional data for comparing and inspecting the image data of an ideal item and the image data of an actual inspection target item. However, in actual implementation through the actual processing device and the like, the image data and the additional data for comparison and inspection do not necessarily have to be bundled with each other, and it will be understood by a person skilled in the art to create and manage each data through separate processes for the convenience of creation, processing and management and consider these collectively as the reference data.

The procedure of generating the reference data begins by a first user instructing the item inspection apparatus 100 according to an embodiment of the present invention to generate reference data in step of 210. According to the command to generate the reference data, the item inspection apparatus starts work to generate the reference data.

The generation of the reference data begins with a step 220 of generating a captured image for a sample item corresponding to the good item. Similar to what has been described above, in order to acquire a captured image of an item to be included in the reference data, the sample item is transferred by the transfer section 110, and a three-dimensional image data may be generated by the controller 130, if necessary, after the captured image is acquired by the measuring section 120.

Herein, the sample item may be one or several, and in case of several, each captured image for several may be obtained. Also, in order to obtain ideal reference data, it is also possible to perform image measurement several times on the sample item, thereby obtaining the reference data.

In particular, in case that image measurement is performed several times for one or several items, it is also possible to obtain the final reference data through a statistical method on the measured images.

For example, it is also possible to average all the images of a plurality of measured images to obtain one ideal image data and generate reference data therefrom, or to average the captured images generated from the respective images to generate final reference data. Alternatively, it is also possible to generate the reference data from the remaining images except the image having a range outside some deviation in the distribution of the measured images.

Meanwhile, several good items may be specified as sample items. In this case, data measured from each sample item may be somewhat different, but all of these may be used as a basis for determining failure of the inspection target item in inspection. That is, when the reference data is obtained for a plurality of sample items, all of which are used as reference data, and the quality of the inspection target item is good compared to any one of the sample items, it may be determined that the inspection target item is good without having to compare with the reference data from other sample items.

For the captured image obtained, a step 230 of establishing additional data needed as the reference data may be followed. The step 230 of establishing additional data may include, first, a step 231 of displaying the reference data to allow a user to check and modify the reference data, a step 232 of establishing a reference position for the reference data serving as a step of establishing a judgement reference for performing inspection, and a step 233 of establishing a feature for inspection. In addition, the step 230 may further include a step 234 of establishing an inspection area, and a step 235 of establishing a masking area, and the step 230 may further include a step 236 of establishing information on defects or faults that may occur in the inspection target.

The generated reference data may be displayed so that a user may check the image through a display unit (not shown) or the like of the item inspection apparatus 100 in step 231. With the displayed reference data, a user may check the captured image of the currently obtained sample item and, if necessary, make some modifications to the captured image of the sample item.

For example, when the shape of the sample item is not perfectly ideal and there are some faults, a user may modify the reference data of the sample item so that the faults are removed by performing appropriate image processing to an associated portion. In addition, when the reference data is generated from the captured images of a plurality of sample items as described above, in case that there is a defect in only one sample item, the defect may be automatically deleted, or the defect may be displayed on the display unit of the inspection apparatus so that a user may perform appropriate image processing to remove the defect.

A step 232 of establishing a reference position for the captured image of the sample item may be performed. The reference position corresponds to a reference point for comparing the reference data with the captured image generated by measuring the inspection target, and the reference position may be a point or a position having a specific shape in the captured image. The reference position may be established by a user directly specifying a specific shape or the like in the captured image displayed on the display unit through an input device.

Figure 5:
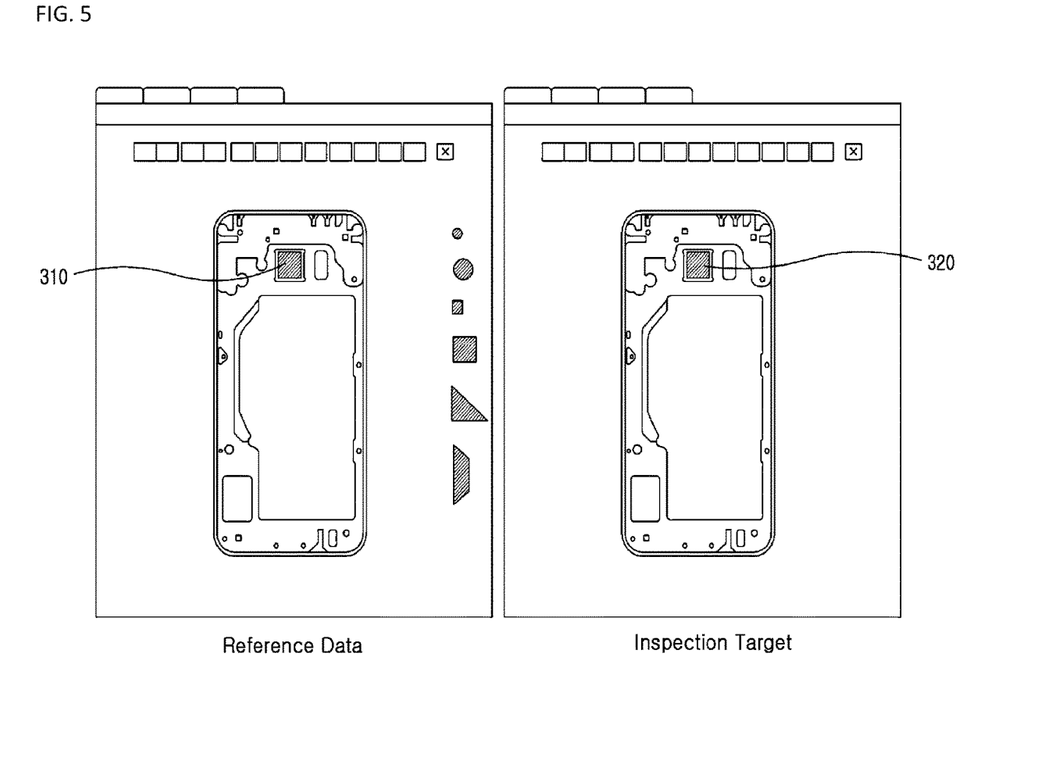
FIG. 5 is a plan view for explaining a method of establishing a feature for item inspection in the process of generating the reference data in FIG. 4.

FIG. 5 is a plan view for explaining a method of establishing a feature for item inspection in the process of generating the reference data in FIG. 4.

As shown in FIG. 5, a specific shape 310 may be established in advance to specify a reference position, and the specific shape 310 may correspond to the feature object described above. The control section 130 of the item inspection apparatus 100 may automatically search for a portion having the associated shape in the captured image of the sample item, to thereby establish the reference position 320 for the associated portion. A plurality of reference positions may be established for an accurate comparison of the inspection target item and the reference data.

As described above, the feature may be established for inspecting an item in step 233. As described above, the inspection of an item may basically be performed by comparing the entire captured image of the reference data with the entire captured image of the inspection target item for each pixel. However, performing such an inspection on all items may lead to an overloading of configurations for performing calculations, such as the control section of the inspection apparatus. In addition, when there is a characteristic structure that the inspection target item should have mainly, it may be an efficient inspection progress to perform inspection on such a portion first.

Accordingly, in order to prevent the deterioration of the inspection quality while improving the inspection progress speed, the inspection may be performed only on the main characteristic of the inspection target item, and the feature may correspond to such characteristic.

Figure 6:
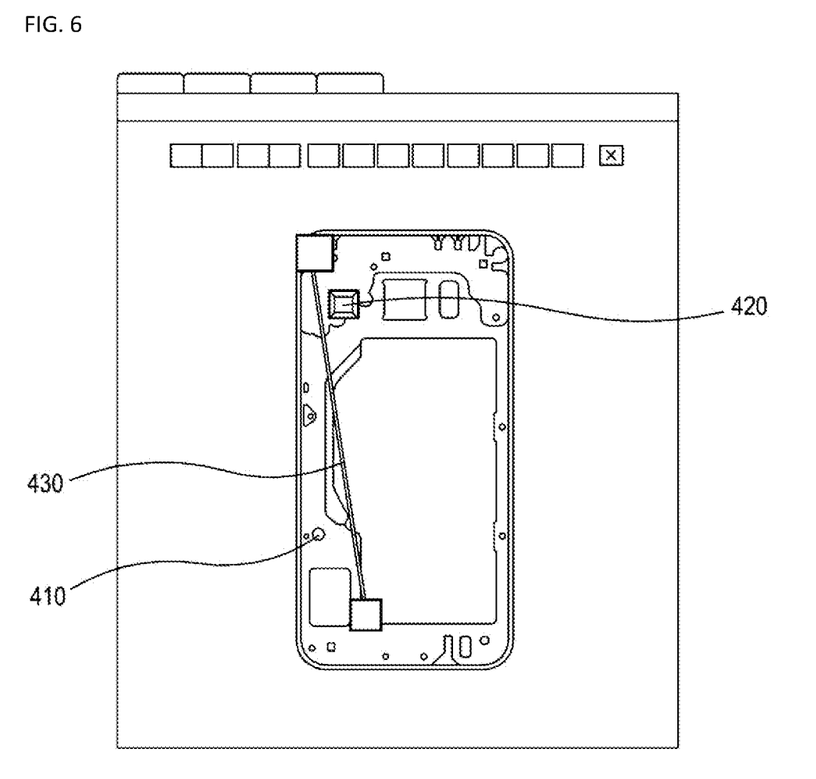
FIG. 6 is a plan view showing a configuration that a reference position is designated in the reference data and the reference position is utilized in the item inspection in the process of generating the reference data in FIG. 5.

FIG. 6 is a plan view showing a configuration that a reference position is specified in the reference data and the reference position is utilized in the item inspection in the process of generating the reference data in FIG. 5.

Referring to FIG. 6, when a circular opening 410 is present in a portion of an inspection target item, an example of the feature may be a position of a central point and a diameter of the opening.

Alternatively, when there should exist a configuration 420 such as a protrusion having a specific height and width at a specific position of the inspection target item, an example of the feature may be information on the configuration. Otherwise, when a distance 430 between two specific points of the inspection target item should be constant, an example of the feature may be information on two points and a distance between the two points. In addition to the above, the features may include characteristics that may improve an inspection speed of the item and maintain the quality of the inspection.

Meanwhile, as described above, the step of generating the reference data has a purpose of generating reference data through a sample item when reference data is not transmitted from outside. In this case, the reference data to be transmitted from outside may include not only the shape of the item but also so-called gerber information including the position, size, or orientation of detailed components to be placed in the item.

Thus, even when the gerber information is not transmitted from the outside, this information may be established together through the step of generating the reference data. For example, a user may specify approximate shape and size of each component through an interface shown on the display, and arrange the position and orientation of the component on the captured image of the sample item shown on the screen, thereby generating information that acts like a gerber.

An inspection area may be established for item inspection in step 234. As described repeatedly above, it is not desirable in terms of time and resources to perform the inspection of the item on the whole area, so that information on a characteristic may be established so as to inspect whether or not a certain condition is satisfied with respect to a main characteristic of the item, which is described above.

On the other hand, it is also possible to establish an area to be carefully examined by a user in addition to the main characteristic. In particular, it is also possible to inspect the entire captured image of the inspection target item so as to inspect defects or faults that should not be included in the inspection target item. However, the time and resource are required for this purpose as described above, and thus an area to be inspected is separately specified to solve this problem.

A masking area may be established for item inspection in step 235. When a captured image is acquired for an item, it may not be necessary to perform an inspection for a specific area such as an area where an opening is formed. In this case, the area may be masked to be excluded from the comparison target.

For the item inspection, a defect type and tolerance thereof may be established in step 236. Depending on the nature of the item, these defect types may vary. For example, in case of a rear case for a mobile phone, which is an inspection target item introduced for the description of the present invention, a user's preference for a mobile phone case made of a metal material recently is high, so that many attempts have been made to fabricate a case of a mobile phone with the metal material, and a method of mass production of components through computer numerical control has been utilized as a method of manufacturing a case with a sleek design. However, there is a possibility that defects such as a scratch or a scrape may occur on manufactured components, and defects in a product itself due to errors in the manufacturing process itself, for example, such as overcut or undercut.

In performing the inspection for the item, finally, comparing data serving as an inspection standard with a three-dimensional image of an actual item, it is judged whether or not such a defect exists in an inspection target item, and if the defect exists, it is necessary to decide how large the defect is and whether the defect is sufficient to judge the inspection target item as defective.

For example, in a rear case for a mobile phone, which is an inspection target item introduced for the description of the present invention, it is necessary to detect a defect having a type such as scratch, scrape, undercut, overcut and protrusion. However, a defect type in a rear case for a mobile phone is not limited to the types listed above. Also, when the inspection target item is other than a rear case for a mobile phone, those skilled in the art will obviously recognize that some of the above defects may not correspond to a defect, or defects other than those listed above may also be a criterion for determining a defective component. In addition to the defect type, there may be established information having such a scope that the inspection target item has the defect type but may be judged not to affect the quality of an actual product, i.e., such as a tolerance for each defect type.

The step 231 of displaying the reference data, the step 232 of establishing the reference position for the reference data, the step 233 of establishing the feature for inspection, the step 234 of establishing the inspection area, and the step 236 of establishing the defect type and the tolerance have been described in the above-described order for the sake of convenience, but the actual order of establishing the respective information is not necessarily the order described above.

In actual implementation of these steps, a person skilled in the art may establish each information in the order described above, in changing the order, or in partially omitting steps if necessary, through separate interfaces appearing when the screen displayed on the display unit is changed. However, at the same time, a person skilled in the art may understand that the respective steps may be implemented so as to establish the respective information regardless of the order described above by a user's operation on a single comprehensive interface displayed on the screen displayed through the display unit. In particular, similarly in the step 231 of displaying an image on the screen, a person skilled in the art may obviously understand that it is also possible to establish the reference position, the feature information, the inspection area and the masking area by using only numerical data such as coordinates without displaying an image on the screen.

After the three-dimensional image of the reference data for the sample item and the additional information necessary for the actual inspection are generated, information on the generated reference data may be displayed on the display unit of the inspection apparatus in step 240. The display unit may display three-dimensional images of the reference data and the additional information established for inspection. A user may check whether the settings for proceeding with the inspection are correctly performed from the displayed information. If necessary, a user may input a command for modifying the specific information through the input device and modify only the associated information in step 250.

In one embodiment, the item inspection apparatus 100 (see FIG. 1) may further include an input section (not shown) for receiving modification information for modifying the feature described above.

The input section may employ a conventional input device such as a keyboard, a keypad, a touchpad, etc., and an interface, for example, such as a graphic user interface (GUI) may be provided for user's easy input.

For example, the modification information may be generated based on statistical processing results on the inspection results obtained by inspection of the item. Herein, the statistical processing may be performed by the control section 130 or a separate processing device externally provided.

Through the steps, the item inspection apparatus according to an embodiment of the present invention may perform the inspection using the sample data even though the reference data, which may be the basis of the comparison, is not prepared or hard to be prepared in advance.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

The invention claimed is:

1. An item inspection apparatus comprising:
   an image obtaining section obtaining a captured image of at least a part of an item; and
   a control section determining whether the item is defective by using the captured image of the item,
   wherein the control section performs:
   a first inspection for at least one of position, shape and size with respect to at least one of a first element and a second element, wherein the first element has a predetermined shape and is formed on the item and the second element includes at least one of an opening, a depression and a through-hole formed in the item; and
   a second inspection for at least one of foreign substance adhesion, scratch and surface stain on the item,
   wherein the item has a defined shape of a solid state, and
   wherein the control section establishes an area corresponding to at least one of an opening, a depression and a through-hole formed in the item as a masking area and performs only the first inspection of the first inspection and the second inspection for the masking area.

2. The item inspection apparatus of claim 1, wherein the control section performs the first inspection by comparing the captured image with reference data of the item corresponding to the captured image, based on a feature defined by a shape-based characteristic of at least one of the first element and the second element externally input or automatically extracted.

3. The item inspection apparatus of claim 2, wherein the feature includes at least one of information on a feature object corresponding to at least one of the first element and the second element and relationship information between a plurality of feature objects.

4. The item inspection apparatus of claim 3, wherein
   the information on the feature object includes at least one of dimension information of the feature object, position information of the feature object, and geometric shape information of the feature object, and
   the relationship information between the plurality of feature objects includes at least one of relative distance information between the feature objects, offset information between the feature objects, and geometric shape information between the feature objects.

5. The item inspection apparatus of claim 3, wherein the control section establishes an inspection area for the feature object, and establishes a good product standard for the feature object.

6. The item inspection apparatus of claim 3, wherein the control section establishes a correlation between the feature objects and establishes a good product standard for the correlation.

7. The item inspection apparatus of claim 1, wherein the control section performs the second inspection by comparing the captured image with reference data of the item corresponding to the captured image based on at least one of height, brightness, and color obtained from the captured image of the item.

8. An item inspection apparatus comprising:
an image obtaining section obtaining a captured image of at least a part of an item; and
a control section determining whether the item is defective by using the captured image of the item,
wherein the control section performs:
a first inspection for at least one of position, shape and size with respect to at least one of a first element and a second element, wherein the first element has a predetermined shape and is formed on the item and the second element includes at least one of an opening, a depression and a through-hole formed in the item; and
a second inspection for at least one of foreign substance adhesion, scratch and surface stain on the item,
wherein the item has a defined shape of a solid state, and
wherein the item corresponds to a component of a final finished product, and the control section excludes from the second inspection where the item is shielded from external exposure by assembly with other components.

\* \* \* \* \*